US006968776B2

(12) United States Patent
Paoletti

(10) Patent No.: US 6,968,776 B2
(45) Date of Patent: Nov. 29, 2005

(54) DEVICE FOR HEATING AND EMULSIFYING LIQUIDS, IN PARTICULAR DRINKS

(75) Inventor: Luciano Paoletti, Cerchiate di Pero (IT)

(73) Assignee: Spidem S.p.A, Milan (IT)

( * ) Notice: Subject to any disclaimer, the term of this patent is extended or adjusted under 35 U.S.C. 154(b) by 0 days.

(21) Appl. No.: 10/482,752

(22) PCT Filed: Jul. 11, 2001

(86) PCT No.: PCT/IT01/00364

§ 371 (c)(1),
(2), (4) Date: Dec. 29, 2003

(87) PCT Pub. No.: WO03/013325

PCT Pub. Date: Feb. 20, 2003

(65) Prior Publication Data

US 2004/0231528 A1    Nov. 25, 2004

(51) Int. Cl.[7] .......................... A47J 31/40; A47J 31/44; A47J 31/46; A23C 9/00; A23L 2/26
(52) U.S. Cl. ........................ 99/353; 99/293; 99/323.1; 99/452
(58) Field of Search .................. 99/452–455, 275–279, 99/293–295, 291, 289 R, 281–286, 300, 99/302 R, 323.1, 323.2, 323.3; 261/78.1, 261/123–126, 121.1, DIG. 16, DIG. 76; 366/101, 163.1, 163.2, 167.1; 426/477

(56) References Cited

U.S. PATENT DOCUMENTS 4,735,133 A    4/1988  Paoletti ....................... 99/454

| | | | |
|---|---|---|---|
| 4,922,810 A * | 5/1990 | Siccardi ..................... 99/323.1 |
| 4,945,824 A * | 8/1990 | Borgmann ................... 99/293 |
| 4,949,631 A | 8/1990 | Fregnan ....................... 99/452 |
| 5,330,266 A * | 7/1994 | Stubaus ..................... 366/101 |
| 5,335,588 A | 8/1994 | Mahlich ...................... 99/293 |
| 5,768,975 A | 6/1998 | Wu ............................. 99/290 |
| 5,768,981 A * | 6/1998 | Cicchetti .................... 99/453 |
| 6,681,685 B2 * | 1/2004 | Mahlich ...................... 99/453 |
| 6,786,138 B2 * | 9/2004 | Johnson et al. ............ 99/323.1 |

FOREIGN PATENT DOCUMENTS

| EP | 0287906 | 10/1988 | .................... 31/44 |
|---|---|---|---|
| FR | 2701373 | 8/1994 | .................... 31/44 |

OTHER PUBLICATIONS

International Search Report dated Mar. 18, 2002.

* cited by examiner

*Primary Examiner*—Timothy F. Simone
(74) *Attorney, Agent, or Firm*—Sofer & Haroun, LLP

(57) ABSTRACT

A device for heating and emulsifying liquids, in particular drinks, which is unusually capable of generating a dense and creamy foam, comprises a steam-emitting member with which a hollow body can be associated. The steam-emitting member comprises a spout positioned along the hollow body at a height such as to be above the level of the liquid to be emulsified. Inserted coaxially inside the hollow body is a duct which defines a first passage and a second passage. A region for communication between the first passage, the second passage and a third passage for air, which is placed in communication with a groove formed in the inner surface of the hollow body, is provided between the steam-emitting member and the duct. The steam-emitting member comprises two annular projections provided with sectors which have different transverse dimensions and which are offset relative to one another and define a labyrinthine path.

22 Claims, 4 Drawing Sheets

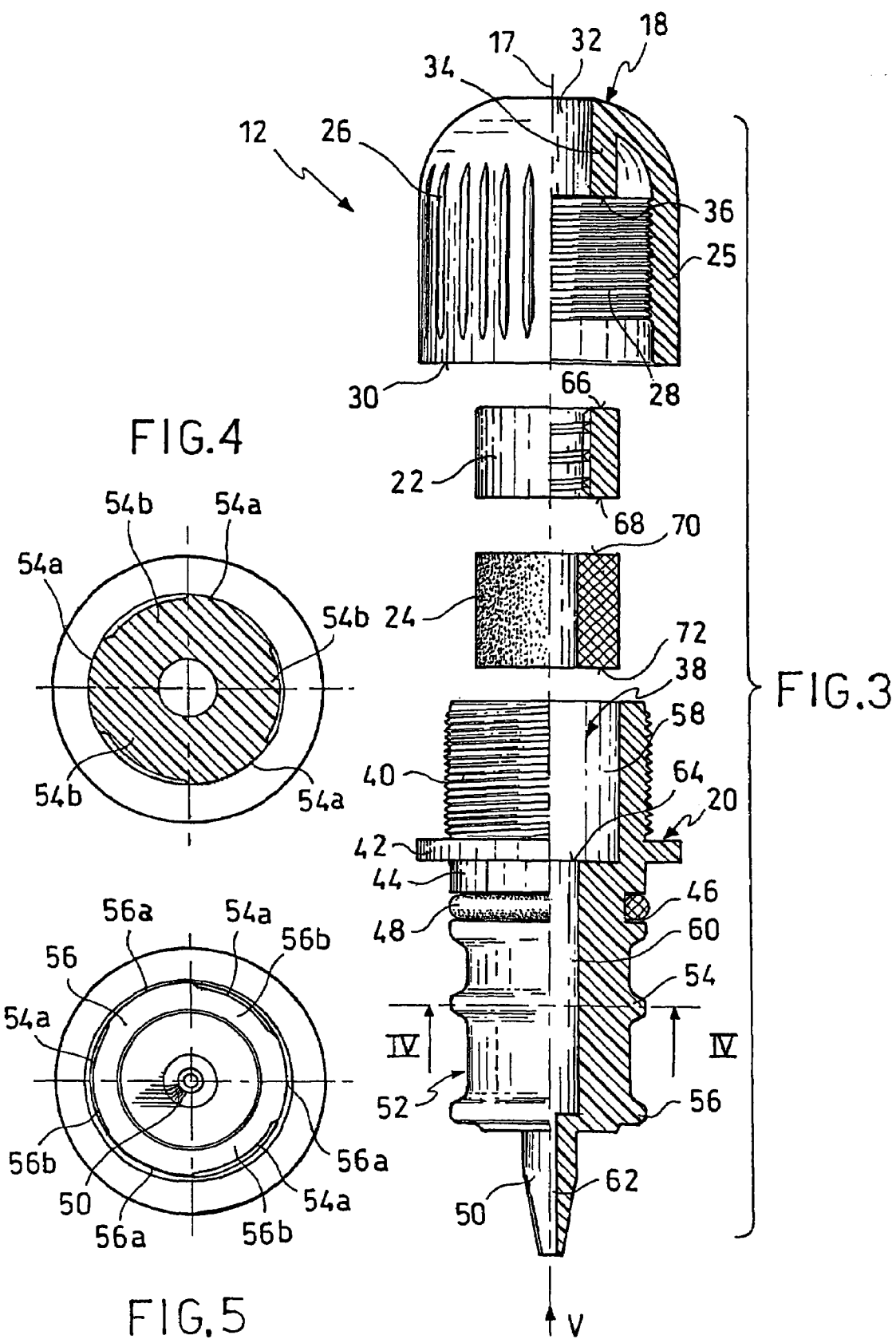

DEVICE FOR HEATING AND EMULSIFYING LIQUIDS, IN PARTICULAR DRINKS

FIELD OF THE INVENTION

The subject-matter of the present invention is a device for heating and emulsifying liquids, in particular drinks, comprising a steam-emitting member and a hollow body which can be associated with the steam-emitting member, liquid and air being sucked into the inside of the hollow body and emulsified liquid being expelled from the inside of the hollow body.

According to a further aspect, the subject-matter of the present invention is a machine for the preparation of hot drinks which comprises at least one source of steam.

BACKGROUND OF THE INVENTION

The present invention relates to a device and to a machine intended especially for the preparation of drinks based on milk, such as, for example, cappuccino, hot milk, chocolate and the like.

To be more precise, the present invention relates to a device and to a machine which are intended both for use in the catering industry, such as, for example, in bars or restaurants, and for domestic use.

As is known, both machines intended for public use and machines intended for domestic use comprise a water-heater for the production of steam which is directed to an emitting member or nozzle. The steam is sent from the latter through the liquid to be heated.

The most characteristic and valued aspect of milk-based drinks, in particular cappuccino, is the presence of foam, which is obtained by emulsifying milk and air. In particular, the more dense and compact the foam is, that is to say, the more numerous, small and intimately dispersed in the milk the air bubbles are, the more the drink is appreciated.

The emulsification stage for obtaining the foam normally takes place during the stage of heating the milk, that is to say, as the steam is being sent through the milk to be heated and emulsified.

It is now common practice to utilise the suction effect produced by the steam leaving the nozzle in order to draw air into the liquid phase of the milk, while the steam heats the milk and is condensed therein or dispersed.

That sequence of stages can be entrusted, for example, to the dexterity of the operator, with the consequence that the density and compactness of the foam depend largely on his or her skill.

It has been found that the final result depends both on the position of the nozzle and on the level of the liquid phase in the milk. It has also been found that the cyclic movement of lifting and lowering the container of milk relative to the steam nozzle promotes the fractionation of the air and its intimate dispersion in the liquid phase, but increases the risk of milk being splashed and spilt.

The disadvantages mentioned above are even more evident in the case of machines for domestic use owing both to the lack of experience on the part of the operator and to the use of limited amounts of milk, and to the small dimensions of the machine and therefore the small amount of steam which can be supplied.

Therefore, a great need is felt in this field to avoid the disadvantages of the manual procedure and in particular to simplify the operations involved. Consequently, devices have been provided for heating and emulsifying liquids, in particular milk, that do not require the presence of an operator with special experience.

For example, a first type of device for heating and emulsifying is known which is constituted by a chamber arranged around the steam nozzle and provided with an opening for the entry of air, an opening for the entry of milk and an opening for the discharge of emulsion.

The functioning known hitherto of those devices provides that the emission of steam produces a partial vacuum inside the chamber which causes the milk and air to be drawn into it. An emulsion of milk, air and steam which leaves via the discharge opening is thus formed in the chamber. Although the three openings corresponding to the entry of milk, the entry of air and the discharge of emulsion are separate, the chamber is constituted by a single space through which milk, air and emulsion pass in a substantially random and turbulent manner.

Another type of device for heating and emulsifying is known and is constituted by a turbulence tube fitted to the end of the steam nozzle and having an opening for the entry of air. The end of the turbulence tube remote from the nozzle is open and is immersed in the liquid to be emulsified. The jet of steam, by pushing the liquid downwards, generates a partial vacuum inside the tube which, on the one hand, draws air through the above-mentioned inlet and, on the other hand, draws liquid through the open end. A turbulent movement of liquid, air, steam and emulsion is therefore created inside the tube. The emulsion is forced by the jet of steam through the open end of the turbulence tube, generating, through that opening, an incoming flow of liquid and an outgoing flow of emulsion.

As is known, although the types of device indicated above simplify the operations of heating and emulsifying a liquid, they are not free from disadvantages.

In the first place, the dimensions of the air particles inside the liquid phase are rather large, with the result that the density, the compactness and the stability of the emulsion over time are not optimum. That disadvantage could be attributable to the establishment of movement or turbulent circulation inside the chamber or turbulence tube which, while agitating the liquid, does not succeed in adequately fragmenting and intimately dispersing the air inside it.

In the second place, the known devices have the disadvantage of being difficult to clean and therefore of being rather unhygienic, areas and recesses being present in which the liquid to be emulsified can settle and coagulate.

In addition, although the opening for the entry of air is generally positioned at some distance from the inlet for liquid, the liquid may rise as far as the air inlet opening and partially block it, thus changing the proportions of air and liquid to be emulsified. In addition, small modifications in the air flow rate have a detrimental effect on the quality of the emulsion obtained, since this quality depends on a precise proportional ratio worked out between the amount of air sucked in and the amount of liquid processed by the device.

In addition to the above, the known devices provide that the steam nozzle, and in particular the steam outlet orifice, be arranged near the inlet for the liquid. That structure has the further disadvantage of the formation of scale along the steam duct. This is caused by the fact that the liquid can rise along the steam nozzle as far as the tap which cuts it off, as a result of the effect of the almost instantaneous partial vacuum generated by the cooling by immersion in cold milk of the duct carrying steam that is saturated or almost at atmospheric pressure. The immediate suction generates a spurt of cold milk which rises through the nozzle and along the steam duct and which causes the almost instantaneous condensation of the entire volume of saturated or slightly unsaturated steam which was occupying the cavities leading from the nozzle as far as the barrier represented by a tap which normally cuts off the pressure and brings about the supply of steam.

Finally, the known devices have a structure which is rather complicated to produce, above all in the case of the first type of device discussed above. In that structure, the openings for the entry of milk and the discharge of emulsion are rather small in an attempt to keep them as separate as possible, thus preventing the processing of large amounts of liquid and therefore increasing the emulsification times.

The problem on which the present invention is based is to propose a device for heating and emulsifying liquids, in particular drinks, and a machine for the preparation of hot drinks, which device and machine have structural and functional characteristics such as to satisfy the above-mentioned requirements and, at the same time, to overcome the above-mentioned disadvantages discussed with reference to the prior art.

SUMMARY OF THE INVENTION

The problem is solved by a device for heating and emulsifying liquids, of the type specified above, wherein the hollow body comprises means for defining two separate passages that communicate with one another and with the outside of the hollow body: a first passage towards which the steam is directed, creating a region of partial vacuum inside the hollow body; and a second passage through which the liquid is sucked from outside the hollow body and is redirected with the air towards the outside through the first passage.

The problem is also solved by a machine for the preparation of hot drinks according to the invention.

BRIEF DESCRIPTION OF THE DRAWINGS

Other characteristics and the advantages of the device and the machine according to the invention will emerge from the following description of a preferred embodiment thereof which is given by way of non-limiting example with reference to the appended drawings in which:

FIG. 3 is a partly sectioned exploded view of a detail of FIG. 2;

FIG. 4 is a cross-section through the detail of FIG. 3 along the line IV—IV;

FIG. 5 is a view in direction V of the detail of FIG. 3;

DETAILED DESCRIPTION OF THE INVENTION

Referring to the above-mentioned drawings, a device for heating and emulsifying liquids, in particular milk-based drinks, is generally indicated 10.

Figure 1:
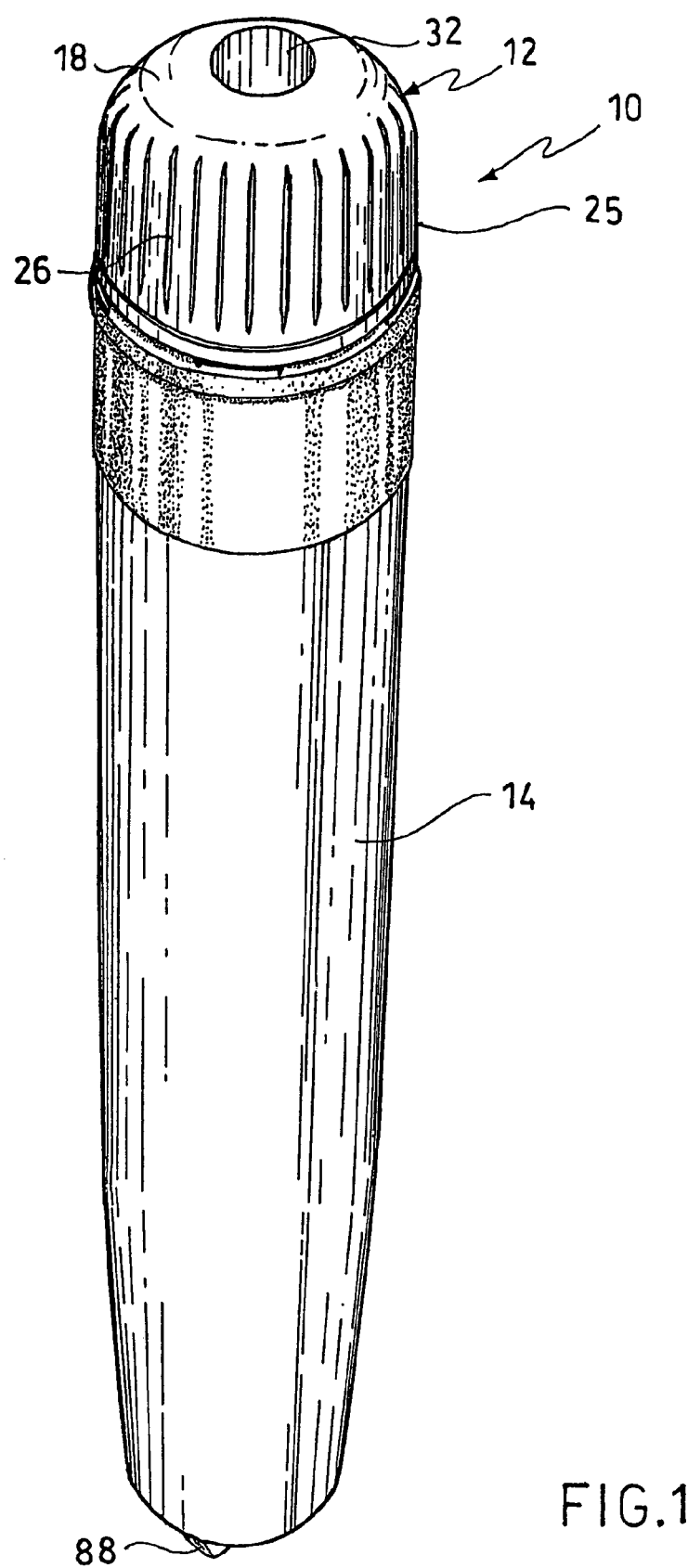
FIG. 1 is a perspective view of a device for heating and emulsifying liquids according to the present invention.

FIG. 1 is a perspective view of that device, which is composed externally of a member 12 for emitting steam, or a nozzle, which is partially inserted into a hollow body 14 which can be associated with the above-mentioned steam-emitting member.

According to one possible embodiment, the device 10 thus formed extends predominantly along an axis 16. In addition, still in accordance with one possible embodiment, the transverse dimensions of the hollow body 14 and of the projecting portion of the member 12 are substantially comparable, so that the device 10 has an elongate structure free from obvious projections.

The steam-emitting member 12 also has a structure which extends predominantly along an axis 17 which, when the device 10 is assembled, coincides with the axis 16. According to one possible embodiment, the structure is composed, for example, of a connecting ring nut 18, a steam-emitting body 20, a connecting element 22 and a sealing member 24, as can be seen, for example, in FIGS. 2 and 3.

According to one possible embodiment, the connecting ring nut 18 has a substantially axially symmetrical structure, having the above-mentioned axis 17 as the axis of symmetry.

In particular, the connecting ring nut 18 may have an outer wall 25 having a substantially cylindrical portion which is provided externally with knurling 26 and internally with a threaded portion 28. The outside diameter of the cylindrical portion coincides substantially with the outside diameter of the hollow body 14.

The external wall 25 is open at the ends. In particular, a first end has an opening 30 with a diameter equal to the diameter of the cylindrical portion, while a second end has an opening 32 having a diameter smaller than the diameter of the cylindrical portion. According to one possible embodiment, the outer wall 25 tapers in a curved manner to form the opening 32.

In addition, 34 indicates an inner wall which is also cylindrical and which extends continuously from the outer wall 25, starting from the above-mentioned opening 32, towards the inside of the ring nut 18 and has an axis coinciding with the axis 17. The diameter of the inner wall 34 therefore coincides substantially with the diameter of the opening 32. In addition, on the opposite side relative to the opening 32, the inner wall 34 has a free surface 36.

According to one possible embodiment, the body 20 of the steam-emitting member 12 has, overall, a substantially axially symmetrical structure about an axis which coincides with the above-mentioned axis 17. In accordance with a further embodiment, some possible exceptions to the axial symmetry will be described hereinafter.

The body 20 has an inner duct 38 which extends along the axis of symmetry of the body, that is to say, along the above-mentioned axis 17.

Both along the outer wall of the body 20 and along the inner wall of the duct 38 it is possible to distinguish a sequence of regions or portions, each of which is suitable for fulfilling a specific task.

According to one possible embodiment, starting from one end of the outer wall of the body 20, it is possible to distinguish a first portion 40 which is externally threaded and which is capable of receiving the connecting ring nut 18 by way of its threaded portion 28.

42 indicates an annular projection which delimits the first portion 40 and which has transverse dimensions which coincide substantially with the outer transverse dimensions of the ring nut 18 and of the hollow body 14.

Continuing along the outer wall of the body 20, starting from the annular projection 42, it is possible to distinguish a second portion 44 which has a cylindrical structure and which is provided with an annular groove 46 suitable for receiving a sealing ring 48, for example of rubber or another resilient material. The diameter of the second portion is slightly smaller than the inside dimensions of the hollow body 14.

The body 20 continues in a spout 50 from which the steam is discharged. The spout has a smaller diameter than the diameter of the second portion 44 and has a cylindrical structure which tapers towards the free end of the spout.

According to a further embodiment, a third portion 52 which has a diameter slightly smaller, as a whole, than the diameter of the second portion 44 and which is provided with two annular projections 54 and 56 may be present between the second portion 44 and the spout 50. Each projection has first sectors respectively indicated by the reference 54*a* and 56*a* which alternate with second sectors respectively indicated by the reference 54*b* and 56*b*. The first sectors have a diameter slightly larger than the diameter of the second sectors. In addition, the sectors of any one annular projection are offset relative to those of the adjacent annular projection.

The example illustrated in the drawings, and in particular in FIGS. 4 and 5, shows one possible embodiment of the annular projections 54 and 56. Each of them comprises three first sectors 54*a* and 56*a* alternating with as many second sectors 54*b* and 56*b*.

The cross-section of FIG. 4 illustrates the three first sectors 54*a* of the annular projection 54 which are arranged at intervals of 120° relative to one another, as are the respective second sectors 54*b*. In addition, FIG. 5 illustrates the three first sectors 56*a* of the annular projection 56 which are arranged at intervals of 120° relative to one another, as are the respective second sectors 56*b*. FIG. 5 also shows that the sectors 54*a* and 54*b* of the annular projection 54 are offset by 60°, that is to say, by half the interval, relative to the associated sectors 56*a* and 56*b* of the annular projection 56.

FIGS. 4 and 5 also show one possible form of the edge of the above-mentioned annular projections 54 and 56, and thus of the respective sectors. According to one possible embodiment, both the outer edge of the first sectors 54*a* and 56*a* and the outer edge of the second sectors 54*b* and 56*b* extend in accordance with circumferential arcs of larger and smaller diameters, respectively, which are connected at the point of transition from one sector to the other.

Figure 2:
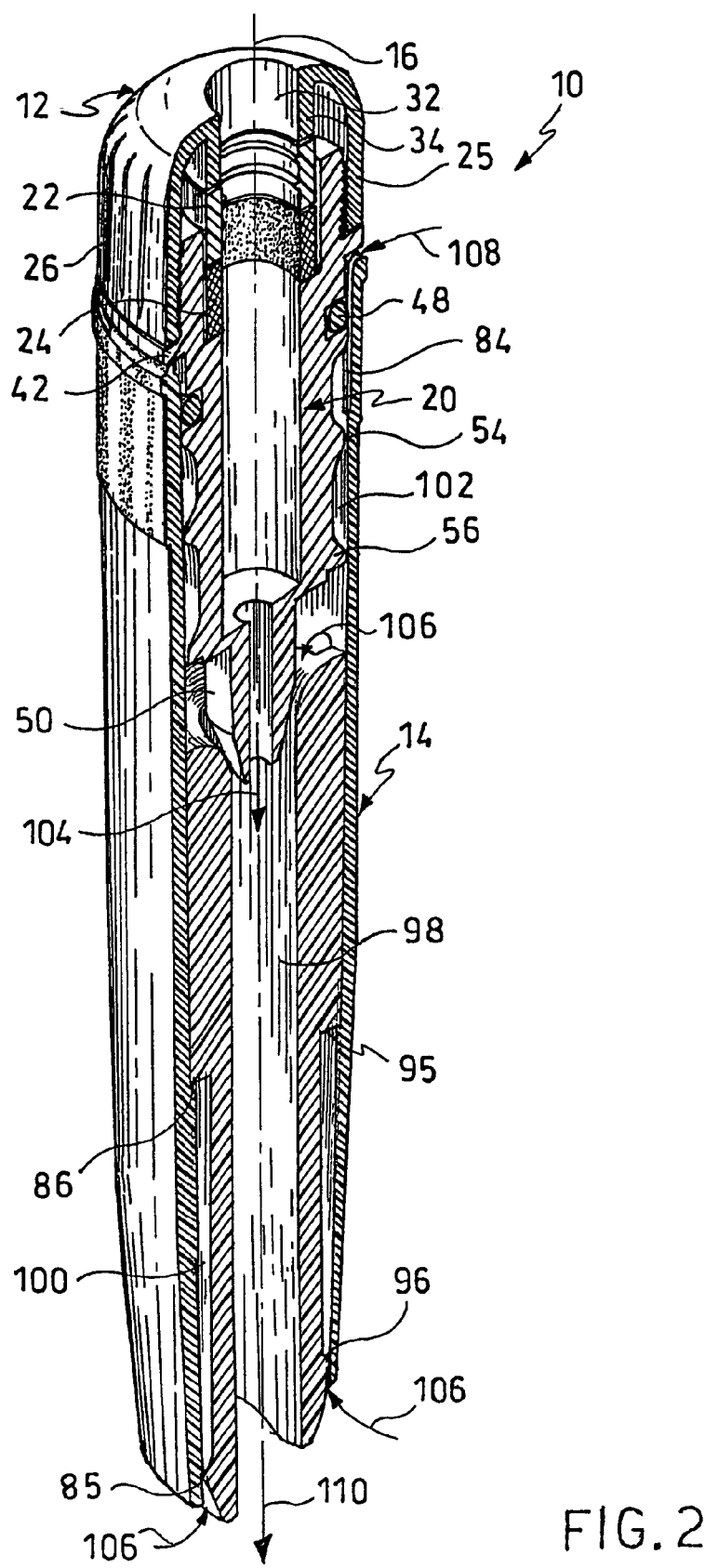
FIG. 2 is a longitudinal section through the device of FIG. 1.

Also as regards the inner wall of the duct 38, according to one possible embodiment which is illustrated, for example, in FIGS. 2 and 3, it is possible to distinguish a sequence of regions or portions defining cylindrical cavities of variable diameter, the extension of which is definable in relation to the above-described portions of the outer wall. The inner duct 38 defines a first portion 58 arranged at the location of the threaded first portion 40 and the projection 42 of the outer wall. It is also possible to provide a second portion 60 which is arranged at the location of the second portion 44 and optionally at the location of the third portion 52 of the outer wall, and a third portion 62 arranged at the location of the spout 50.

According to one possible embodiment, the first portion 58 defines a cylindrical cavity having a larger diameter than that of the cylindrical cavity defined by the second portion 60 which, in its turn, has a larger diameter than that of the cylindrical cavity defined by the third portion 62.

The transition from one portion to the next is effected without connections, producing, at least as regards the transition from the first to the second portion, an annular wall 64 arranged transversely to the inner duct 38.

As already mentioned above, the steam-emitting member 12 comprises the above-mentioned connecting element 22 produced in the form of a hollow cylindrical element which is open at the ends and which has a substantially smooth outer lateral surface and a threaded inner lateral surface.

The radial extension of the connecting element is substantially comparable to the radial extension of the inner wall 34 of the connecting ring nut 18. In particular, the diameter of the opening 32 of the ring nut corresponds substantially to the inside diameter of the connecting element 22, and the thickness of the inner wall 34 corresponds to the thickness of the connecting element 22. Furthermore, the outside diameter of the connecting element 22 is slightly smaller than the diameter of the first portion 58 of the inner duct 38 of the body 20.

The above-mentioned connecting element 22 extends along the axis 17 and each of its ends defines an abutment surface 66 and 68.

Finally, the steam-emitting member 12 comprises the sealing member 24 which, in one possible embodiment, is constituted by a hollow cylinder which is open at the ends and which is produced, for example, from rubber. The above-mentioned sealing member 24 extends along the axis 17 and each of its ends defines an abutment surface 70 and 72.

The radial dimensions of the sealing member 24 are comparable to the radial dimensions of the connecting element 22. The radial dimensions of the sealing member 24 are also substantially equal to the radial dimensions of the annular wall 64 which defines the cross-section of passage between the first portion 58 and the second portion 60 of the inner duct 38 of the body 20.

The connecting ring nut 18, the body 20, the connecting element 22 and the sealing member 24, described separately as illustrated in FIG. 3, are described hereinafter in respect of their mutual interaction in forming the steam-emitting member 12, as illustrated in FIG. 2.

According to one possible embodiment, all the elements described above are assembled in such a manner that the respective axes of symmetry coincide with the above-mentioned axis 17, that is to say, with the axis along which the steam-emitting member 12 extends.

The assembly of the emitting member 12 is effected by placing all of the components of FIG. 3 onto a steam-supply duct (not shown) and by tightening the ring nut 18. The ring nut compresses the sealing member 24, bringing about sealing and anchoring to the duct. The sealing member 24 thus acts as a rapid block on the steam-supply duct and therefore, by tightening the ring nut 18, the device 10 is made unitary with the steam-supply duct while, by unscrewing the ring nut 18, it is readily possible to take the device off and wash it.

In particular, the sealing member 24 is inserted in the first portion 58 of the inner duct 38 of the body 20 and the abutment surface 72 is positioned against the annular wall 64. The abutment surface 68 of the connecting element 22 is positioned on the abutment surface 70 of the sealing member 24. The connecting ring nut 18, in which the steam-supply duct is inserted, is screwed onto the body 20, coming into abutment with the projection 42. The free surface 36 of the inner wall 34 comes into contact with the abutment surface 66 of the connecting element 22 and compresses the sealing member 24 axially.

When the steam-emitting member 12 has been assembled, as illustrated, for example, in FIG. 2, the steam-supply duct screwed to the connecting element 22, the sealing member 24 and the second portion 60 of the inner duct 38 define a passage for the steam towards the spout 50.

Figure 6:
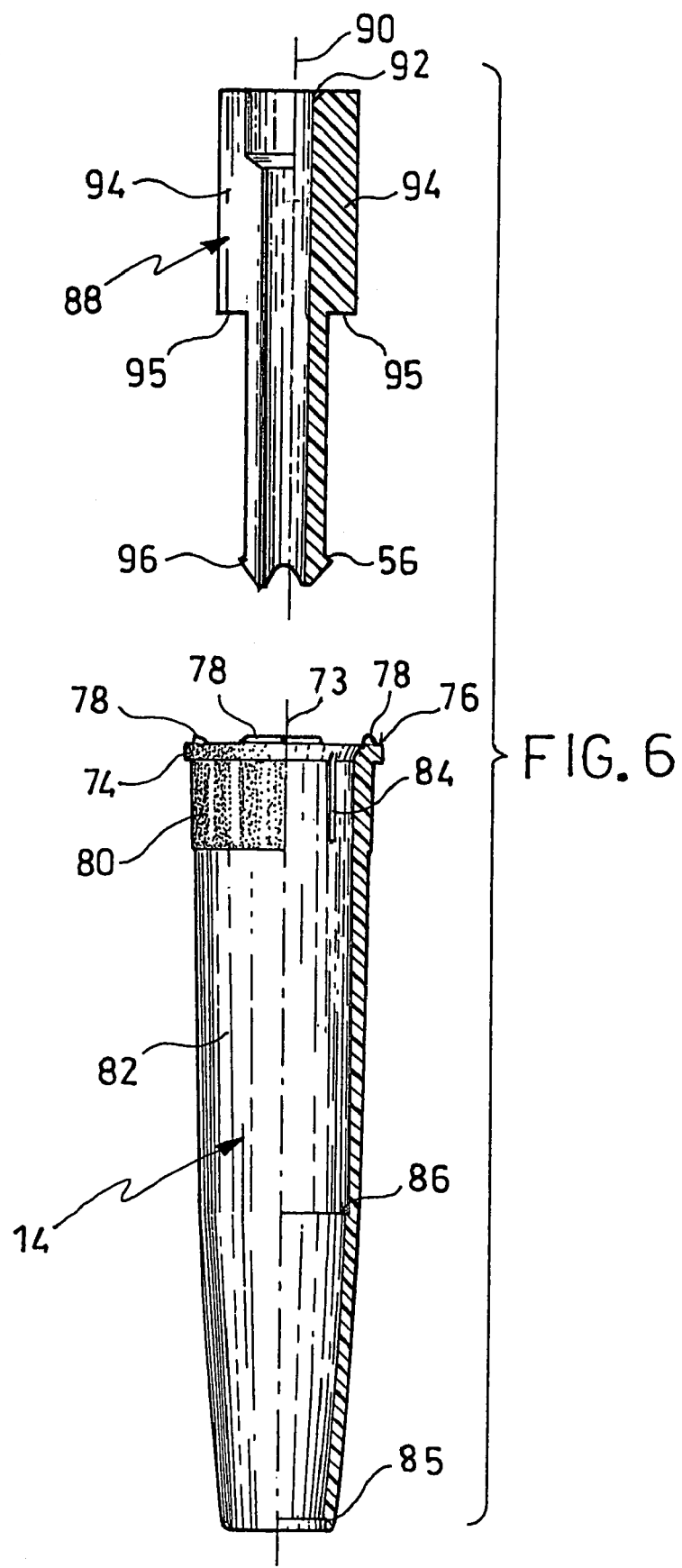
FIG. 6 is a partly sectioned exploded view of a detail of FIG. 2.

As mentioned above, the device 10 also comprises the hollow body 14 which, according to one possible embodiment, is constituted by a structure which is substantially symmetrical with respect to an axis 73. When the device 10 has been assembled, the axis 73 coincides with the axis 16 along which the device extends (FIG. 6).

As illustrated, the hollow body 14 is open at the ends and has a circular cross-section having a radius which is slightly variable along the axis 73. According to one possible embodiment, the hollow body may have a cylindrical portion, that is to say, a portion having a constant cross-section, which extends uninterrupted into a frustoconical, or slightly curved, portion, reducing the inside cross-section.

A first end of the hollow body 14 has an annular projection 74 defining a free surface 76 which is transverse to the longitudinal extension of the hollow body. Some teeth 78 extend from the free surface 76 in the longitudinal direction relative to the hollow body and towards the outside thereof. As illustrated in FIG. 6, it is possible to provide, for example, four teeth which are uniformly distributed over the free surface 76 in the circumferential direction.

The outer surface of the hollow body 14 may have a roughened portion 80 in direct contact with the annular projection 74, and a smooth portion 82 which extends as far as the end remote from the annular projection 74.

84 indicates a longitudinal groove formed in the inner surface of the hollow body 14 starting from the free surface 76 and extending over a portion of the length of the hollow body 14 which is to cooperate with the sealing ring 48 of the steam-emitting member 12.

The end remote from the free surface 76 has an annular tooth 85 arranged at the location of the outer edge of the hollow body.

The inner surface of the hollow body 14 also has an annular rib 86 arranged substantially at the level of the start of the reduction in diameter of the hollow body.

In addition, according to one possible embodiment, the device 10 for heating and emulsifying liquids advantageously comprises a duct 88, illustrated, for example, in FIG. 6, which extends along an axis 90.

The above-mentioned duct is, for example, defined by a hollow cylindrical body which is open at the ends, one of which has a portion having an outside diameter, and thus a thickness, larger than that of the remainder of the duct. At the location of the end having a larger thickness, the mouth of the duct has a lead-in portion 92. The opposite end of the duct 88 is, for example, "C"-shaped.

According to one possible embodiment, the outer surface of the duct 88 is provided with ribs 94, for example, two ribs which are arranged at 180° relative to the duct and which extend in a radial direction therefrom. As illustrated in FIG. 6, the ribs 94 may have a first portion which extends from the lead-in portion 92 as far as an intermediate portion of the duct, and a second portion which continues as far as the "C"-shaped end. The first portion has dimensions transverse to the axis 90 which are larger than those of the second portion and, in particular, which are such as to interfere with an inner region of the hollow body 14. The transition from the first portion to the second portion produces a step 95. In addition, each second portion has a tooth 96 at the location of the "C"-shaped end.

A description is given hereinafter of the method of assembling the above-described device 10 according to the present invention.

The duct 88 is inserted into the inside of the hollow body 14 from the end corresponding to the annular projection 74 and therefore to the cylindrical region having a larger cross-section. The duct 88 is subsequently forced into the hollow body 14 at the location of the portion in which the latter has a cross-section decreasing towards the end remote from the projection 74.

By forcing the duct 88 into the hollow body 14, interference and friction is generated between the inner walls of the hollow body 14 and the ribs 94 and therefore the duct 88 is temporarily stable inside the hollow body 14, with the teeth 96 of the ribs 94 positioned beyond the annular tooth 85 and with the step 95 interfering with the annular rib 86.

The duct 88 and the hollow body 14 are therefore coaxial and the respective axes coincide with the axis 16 along which the device 10 extends. The "C"-shaped end of the duct 88 also projects slightly from the hollow body 14.

The arrangement of the duct 88 in the hollow body 14 defines two separate passages communicating with one another and with the outside of the hollow body 14. A first passage is indicated by the reference 98 and is constituted by the channel inside the duct 88. A second passage is indicated by the reference 100 and is constituted by the gap which is created between the hollow body 14 and the duct 88.

The two passages communicate with the outside at the location of the end of the hollow body 14 that accommodates the "C"-shaped end of the duct 88. In addition, the two passages communicate with one another at the location of the lead-in portion 92 of the duct 88.

Consequently, the duct 88 provides, inside the hollow body 14, means for defining two separate passages that communicate with one another and with the outside of the hollow body.

Subsequently, the emitting member 12 assembled as described above is friction-fitted inside the hollow body 14 from the end where the annular projection 74 is arranged. The friction between the hollow body 14 and the emitting member 12 is generated by the presence of the sealing ring 48.

The annular projection 42 abuts the teeth 78 and the sealing ring 48 is positioned in an intermediate region relative to the length of the groove 84. The emitting member 12 inserted in the hollow body 14 is coaxial therewith, and the axis 17 along which the emitting member extends also coincides substantially with the axis 16 along which the device 10 extends.

As illustrated in FIG. 2, when the duct 88 and the emitting member 12 are inserted in the hollow body 14, the tapered portion of the spout 50 is partially inserted in the duct 88, at the location of the lead-in portion 92, although it does not obstruct the inlet of the duct. Therefore, the two passages 98 and 100 remain in communication with one another even when the steam-emitting member 12 is inserted.

The groove 84 and the portion between the hollow body 14 and the body 20 of the steam-emitting member 12 define a third passage 102 which opens out in the region in which the first and second passages communicate with one another.

If the two annular projections 54 and 56 are present, they, and in particular the first sectors 54a and 56a, come into contact with the inner surface of the hollow body 14. Consequently the third passage is winding in nature and is narrow in cross-section at the location of the second sectors 54b and the second sectors 56b.

Following the reverse procedure to that described above, it is possible to disassemble the device 10 and thus to make the individual components available for cleaning and/or replacement.

A description is given hereinafter of the functioning of a device 10 for heating and emulsifying liquids according to the present invention.

The hollow body 14 is partially inserted into a container (not illustrated) containing the liquid to be emulsified, for example milk.

As a result of opening the steam jet, the steam leaves the spout 50 in a direction indicated 104 and is directed towards the duct 88 and therefore towards the first passage 98.

The hollow body 14 constitutes a kind of Venturi tube in which the discharge of steam from the emitting member 12 produces a partial vacuum inside the hollow body 14 which in turn causes liquid to be drawn through the second passage 100 in a direction indicated 106. Similarly, air is drawn through the groove 84 and the third passage 102, in a direction indicated 108.

The liquid which rises along the second passage and the air which descends from the third passage meet at the location of the region of communication between the first and the second passage and, owing to the partial vacuum, are re-directed towards the outside through the first passage. Air and liquid come into intimate contact, thus producing an emulsion which is discharged from the hollow body 14 via the first passage, together with the steam, in a direction indicated 110.

The process of emulsifying and heating thus takes place as a result of the passage of the steam through the liquid.

As will be appreciated from the above description, the device for heating and emulsifying liquids according to the present invention satisfies the above-mentioned requirement of simplifying the operations involved, and also enables a non-expert operator to obtain a foam for producing drinks, for example, based on milk, such as cappuccino, milk with a dash of coffee, etc.

Furthermore, the device according to the invention permits greatly forced fragmentation of the air particles and intimate and uniform distribution of the air in the liquid phase, thus generating a foam which is dense, creamy and stable over time.

The device in question also has a simple and economical structure constituted by means which define separate passages for the milk and the emulsion. The passages have a relatively large cross-section in order to permit the processing of large quantities of liquid, while still keeping brief the time taken to heat and emulsify those quantities. It has in fact been found that the structure in question permits increased speeds and increased flow rates which enable three or four times the volume of the cups normally used to be processed rapidly.

The above is further supported by the fact that the provision of separate passages limits turbulence, permitting increased acceleration of the milk along a substantially straight passage. One of the main advantages of the device in question is therefore the fact that it produces an increased speed and flow rate together with the fact that it directs the flows along well defined paths, thus obtaining an increased dynamic impact force.

In particular, one functional characteristic of the device in question is the reduced amount of air drawn through the groove 84, which is suitably provided with small dimensions and which is optionally protected through a winding and labyrinthine path. The reduced amount of air drawn through, together with the increased speed and flow rate achieved in the hollow body enable the milk to be nebulised in extremely small bubbles which, precisely owing to their small dimensions, do not float on the surface but eddy in the liquid mass and can thus be reabsorbed by the flow and broken down several more times. This produces a high degree of creaminess in the foam, which floats on the liquid only when the operation has been completed.

The structure which is especially simple, which is easy to disassemble and which is provided with wide openings permits rapid and efficient cleaning, avoids scaling and ensures that the device is hygienic.

By maintaining a given distance between the spout 50 and the surface of the milk in which the device is immersed, it is possible to prevent the milk rising along the steam-emitting member 12 as far as the tap which cuts it off. That phenomenon is normally due to the almost instantaneous partial vacuum generated by the cooling of the duct carrying steam that is saturated or almost at atmospheric pressure when the device is immersed in the cold milk. If the spout 50 were arranged closer to the surface of the milk, the partial vacuum would cause cold milk to be sucked along the steam-supply duct, which would in turn bring about the condensation of the volume of saturated or slightly unsaturated steam between the spout 50 and a cut-off tap arranged along the duct.

In addition, the presence of the projections 54 and 56 defines for the air a winding path with narrowed portions, which path, while guaranteeing the flow of the correct amount of air necessary for the optimum emulsion result, prevents the liquid from rising as far as the groove 84, and thus blocking it and changing the air/milk ratio. The provision of an air passage having a labyrinthine and winding structure enables the dimensions of the groove 84 to be kept small since it prevents the milk from rising as far as the groove and blocking it.

It will be appreciated that variants and/or additions to what has been described and illustrated above may be provided.

As an alternative to what has been represented in FIG. 3, the member 12 may comprise elements having different shapes and sizes. The ring nut could be replaced by a direct threaded connection between the body 20 and the steam duct coming from the water-heater.

In particular, it is possible to provide either a member 12 provided with annular projections 54 and 56, or a member 12 in which the third portion 52 is constituted by a cylindrical portion free from projections.

The two projections 54 and 56 may also be provided in a different number, shape and size, in order to introduce winding portions along the third passage for the air. For example, it is possible to provide first and second sectors which are different in terms of number, shape and size. Alternatively, instead of the projections and the associated sectors, it is possible to provide lobes, teeth, spiral elements or any other means suitable for introducing winding portions along the path followed by the air inside the hollow body 14, or to introduce a labyrinthine structure which prevents the passage of milk but permits the passage of air.

The device 10 is, for example, produced from plastics material although other types of material may be provided for.

The hollow body 14 may have different shapes and sizes, for example a prismatic or frustoconical shape.

The groove 84 may be provided on the member 12 instead of on the hollow body 14. It is also possible to provide that the air inlet be constituted by a through-hole instead of by a groove.

The duct 88 may also have a different shape and size, as may the ribs 94 which may also be provided in a larger number.

The emitting member 12 and the duct 88 may be provided in one piece, for example by connecting the spout 50 to the duct, but leaving some openings for communication between the first and the second passage. In that case, the ribs 94 may not be necessary.

Furthermore, it is possible to provide means other than the friction between the ribs and the hollow body in order to make the duct 88 unitary with the hollow body. For example, a threaded connection or a snap connection of a different nature may be provided.

Finally, the hollow body could have protuberances (not shown) which extend longitudinally and project in length beyond the "C"-shaped end of the duct 88 in order to provide a region for support on the base of the container containing the liquid to be emulsified.

Finally, while maintaining the inventive concept which enables the problem on which the present invention is based to be solved, it is possible for the device in question to be produced in accordance with structurally known variants in order to obtain a jet of steam and suction of liquid and air for the production of an emulsion.

In order to satisfy contingent and specific requirements, a person skilled in the art could introduce numerous modifications, adaptations and replacements of elements by other functionally equivalent elements to the preferred embodiment of the device described above without thereby departing from the scope of the following claims.

What is claimed is:

1. A device for heating and emulsifying liquids, in particular drinks, comprising:
    a steam-emitting member and a hollow body which can be associated with the steam-emitting member, liquid and air being sucked into the inside of the hollow body and emulsified liquid being expelled from the inside of the hollow body, wherein the hollow body comprises means for defining two separate passages that communicate with one another and with the outside of the hollow body, the two passages including a first passage towards which the steam is directed, creating a region of partial vacuum inside the hollow body, and a second passage through which the liquid is sucked from outside the hollow body and is re-directed with the air towards the outside through the first passage;
    and a third passage for air is provided inside the hollow body, in which the two separate passages are coaxial with one another and the means for defining two separate passages comprise a duct inserted coaxially in the hollow body, the first passage being constituted by the channel inside the duct towards which the steam leaving a spout of the steam-emitting member is directed, and the second passage being constituted by a gap which is created between the hollow body and the duct,
    whereby the liquid which rises along the second passage and the air which descends from the third passage meet at a location of a region for communication between the first passage, the second passage and the third passage provided between the steam-emitting member and the duct, and, owing to the partial vacuum, are re-directed towards the outside through the first passage.

2. A device according to claim 1, wherein the duct is inserted with interference in the hollow body.

3. A device according to claim 2, wherein the duct comprises longitudinal ribs.

4. A device according to claim 3, wherein the ribs comprise a step which is to abut an annular rib formed in the inner surface of the hollow body.

5. A device according to claim 1, wherein the duct comprises teeth which are to be positioned beyond an annular tooth formed in the inner surface of the hollow body.

6. A device according to claim 1, wherein one end of the duct comprises a lead-in portion.

7. A device according to claim 1, wherein one end of the duct is "C"-shaped.

8. A device according to claim 1, wherein the duct is connected to the steam-emitting member and comprises at least one opening for communication between the first passage and the second passage.

9. A device according to claim 1, wherein the hollow body comprises at least one portion having a cross-section which decreases in the direction away from the steam-emitting member.

10. A device according to claim 1, wherein a free surface of the hollow body has teeth.

11. A device according to claim 1, wherein the inner surface of the hollow body comprises a groove for the entry of air, the third passage being placed in communication with that groove.

12. A device according to claim 1, wherein the third passage comprises means for providing it with winding portions and/or for varying the passage cross-section thereof.

13. A device according to claim 12, wherein the steam-emitting member comprises at least one annular projection provided with first sectors and second sectors, the first sectors having a transverse dimension relative to the member which is larger than the transverse dimension of the second sectors.

14. A device according to claim 13, wherein the emitting member comprises at least two annular projections, the sectors of the one being offset relative to the sectors of the other.

15. A device according to claim 1, wherein the third passage comprises a labyrinthine path.

16. A device according to claim 1, wherein the steam-emitting member comprises a spout positioned along the hollow body at a height such as to be above the level of the liquid to be emulsified.

17. A machine for the preparation of hot drinks, comprising at least one source of steam, comprising a device for heating and emulsifying liquids, according to claim 1, which can be associated with the source of steam.

18. A device according to claim 1, wherein the duct is inserted coaxially in the hollow body downstream the steam-emitting member along the direction of the steam.

19. A device according to claim 1, wherein the duct is inserted coaxially in the hollow body and an end of the duct projects slightly from the hollow body.

20. A device according to claim 1, wherein the end of the duct which projects slightly from the hollow body is a "C"-shaped end.

21. A device according to claim 1, wherein the two passages communicate with one another at the location of a lead-in portion of the duct.

22. A device according to claim 1, wherein the two separate passages are substantially straight.

* * * * *